Nov. 4, 1952          F. W. KNOWLES          2,616,271

ICE MACHINE

Filed March 20, 1939          4 Sheets—Sheet 1

INVENTOR.
Frank W. Knowles
BY Paul Bliven
ATTORNEY.

Nov. 4, 1952     F. W. KNOWLES     2,616,271
ICE MACHINE

Filed March 20, 1939     4 Sheets—Sheet 2

INVENTOR.
Frank W. Knowles
BY Paul Bliven
ATTORNEY.

Nov. 4, 1952 — F. W. KNOWLES — 2,616,271
ICE MACHINE
Filed March 20, 1939 — 4 Sheets-Sheet 3

INVENTOR.
Frank W. Knowles
BY Paul Blven
ATTORNEY.

Nov. 4, 1952 F. W. KNOWLES 2,616,271
ICE MACHINE
Filed March 20, 1939 4 Sheets-Sheet 4
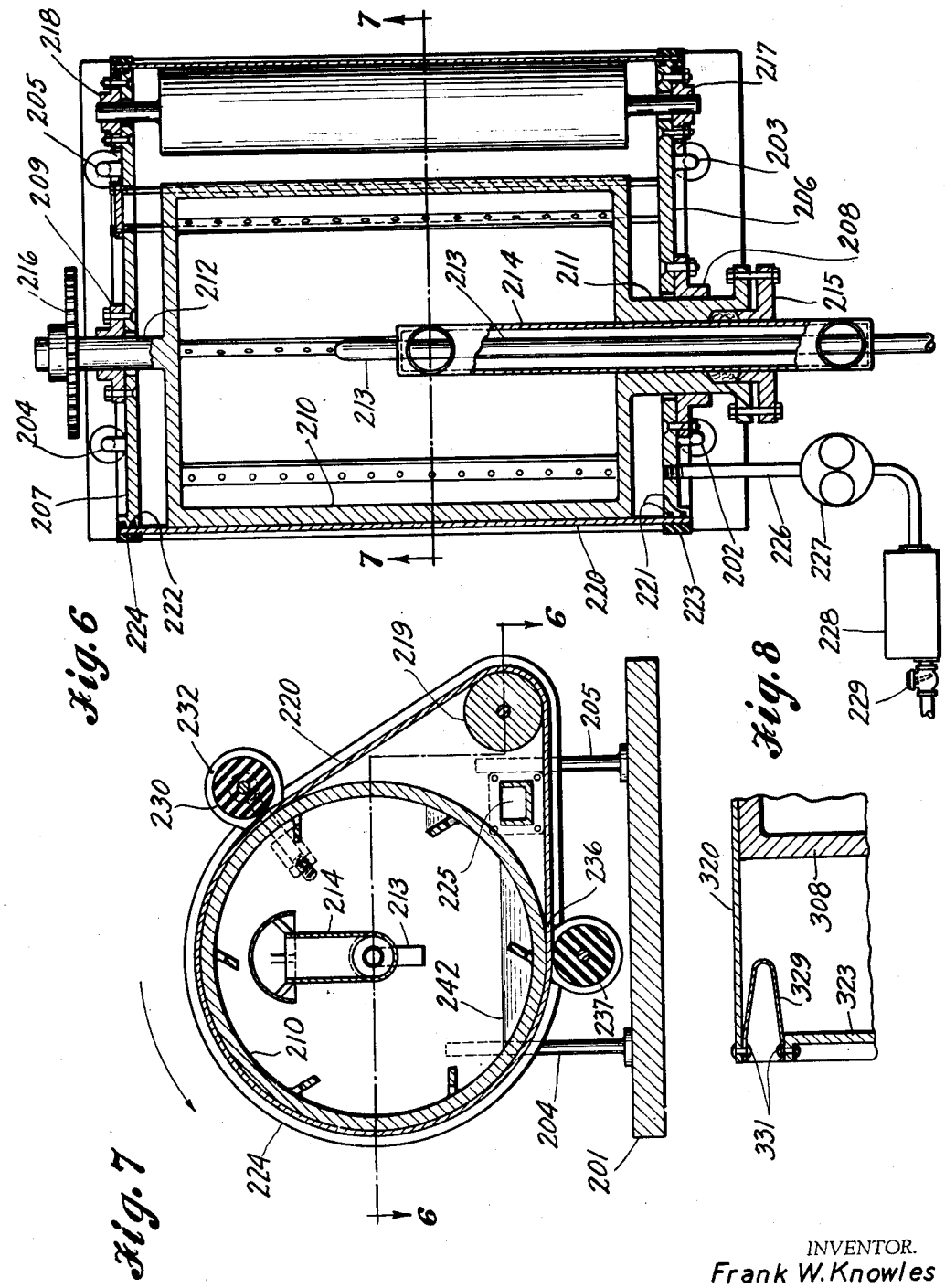
INVENTOR.
Frank W. Knowles
BY Paul Bliven
ATTORNEY.

Patented Nov. 4, 1952

2,616,271

UNITED STATES PATENT OFFICE 2,616,271

ICE MACHINE

Frank W. Knowles, Seattle, Wash., assignor to Beltice Corporation, a corporation of Washington Application March 20, 1939, Serial No. 262,869

20 Claims. (Cl. 62—106)

The present invention relates to heat transfer devices. In particular the device relates to the art of refrigeration but some of the features are of a broader use, such as in the drier and concentrating arts.

In more particular the device relates to the art of solidifying thin sheets of material upon a surface and of removing the material from that surface. Examples are the making of thin sheets of ice, frozen fruits or fruit juices, glue, dried milk, or other material. Such materials have, in the past, been solidified upon drums and scraped therefrom, and solidified upon endless belts and scraped therefrom or removed from adhesion to the belt by flexing, or changing the curvature of the belt.

Removal from a belt by flexing, where applicable to a particular type of material, is more satisfactory than by scraping from a drum. The scraping of a drum requires a scraper, entails wear on the drum and scraper, and is a constant source of expense and adjustment.

Scraping a belt has the same disadvantages as scraping a drum. However, the use of a belt as compared to a drum has disadvantages in that the temperature of a drum may be easily controlled, and the heat transfer from the drum to the material is direct and usually good. These features are not found in the ordinary belt heat transfer device. Also, in the belt device, in many installations, material collects between the belt and the drum, reducing the rate of heat transfer and if the belt is tight and of metal permanently deforming and ruining the belt for the desired use.

It is an object of the present invention to provide a device using an endless belt which will have the high heat conductivity of a drum.

It is a further object of the invention to provide a device using an endless belt, and which device will be so constructed that material cannot collect and solidify between the belt and the drum, drums, or rollers upon which the belt is supported.

It is a further object of the present invention to provide a device using an endless belt in which the end openings of the belt are closed, or sealed.

It is another object of the invention to provide a heat transfer device using an endless belt in contact with a heat transfer drum, and using a highly heat conductive liquid between the belt and drum to increase the rate of heat transfer therebetween.

It is a further object of the invention to provide a device using an endless belt in contact with a drum, circular end plates closing the end openings of the belt, and a flexible connection between the disks and the belt to allow the curvature of the belt to be varied.

It is a further and more specific object of the present invention to provide means for preventing the freezing of moisture between a refrigerated drum and a belt in contact with the drum.

It is a further object of the invention to provide the interior of a drum with baffles which will spread a refrigerant over the walls of the drum.

It is a further object of the invention to form sheets of ice on one side of a belt without condensation on the other.

These objects and others are attained by means of the herein described devices, wherein: an endless metallic belt is placed around and in contact with a large portion of the face of a drum, a roller or rollers guide the belt so that its curvature will be varied and any material adhering thereto separated therefrom, means are provided for sealing and closing the end openings, a liquid is provided between the belt and drum to increase the heat conductivity, and means are provided for either preventing the freezing of moisture between the drum and belt or means are provided for removing any moisture from therebetween.

Devices constructed in accordance with the above are hereinafter described in detail and are shown in the accompanying drawings wherein:

Figure 6 is a longitudinal section on the line 6—6 of Figure 7 showing another modified form of my device.

Figure 7 is a full section on the line 7—7 of Figure 6.

Figure 8 is a partial section through a drum and belt showing a modified form of seal.

Figures 1, 2, and 3

Figure 1:
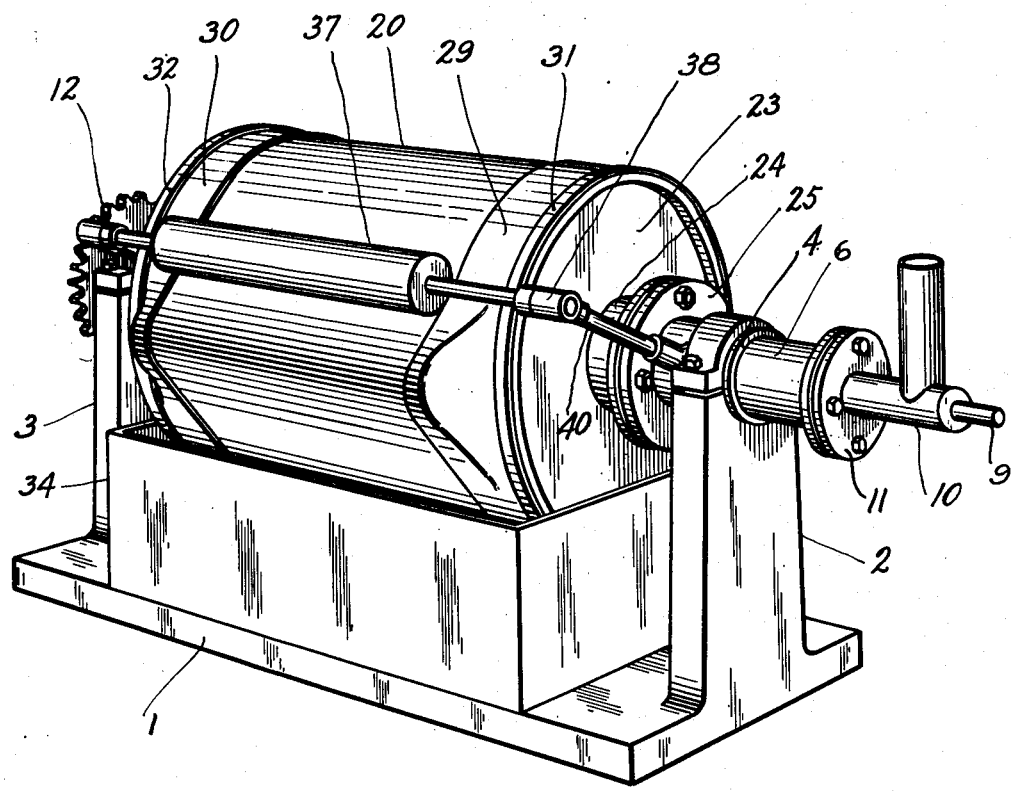
Figure 1 is a perspective view of one form of my device.
Figure 2:
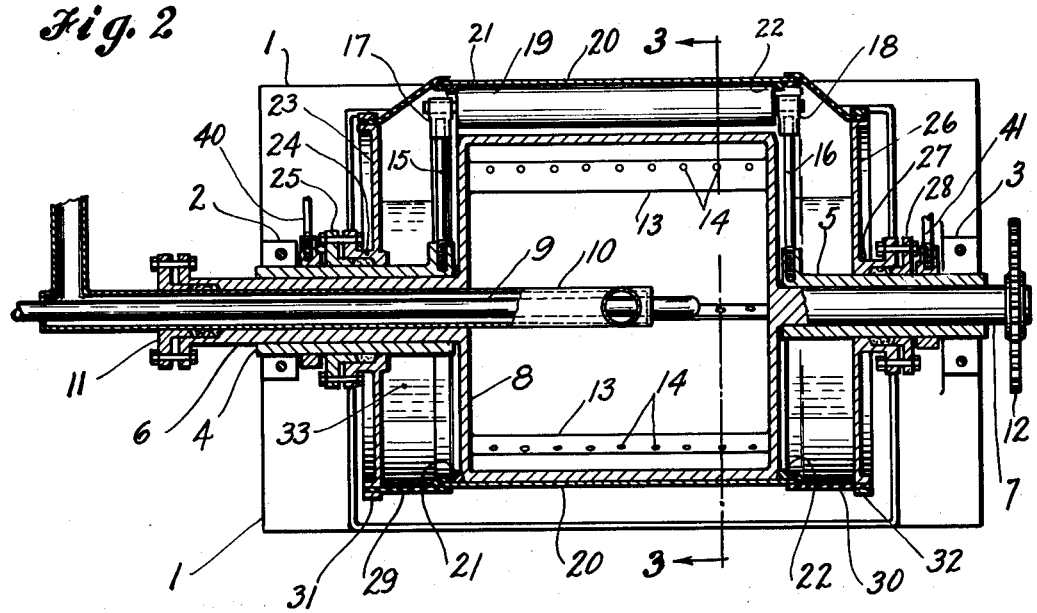
Figure 2 is a plan section of the device shown in Figure 1 and is taken on the line 2—2 of Figure 3.
Figure 3:
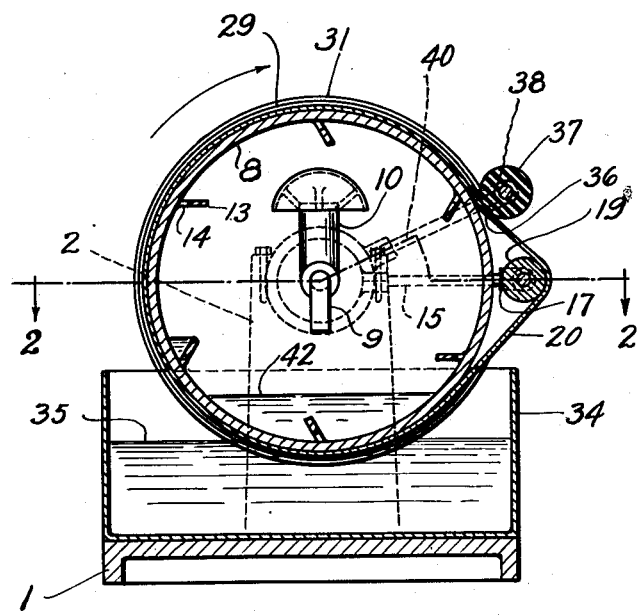
Figure 3 is a full section on the line 3—3 of Figure 2.

Referring to Figures 1, 2, and 3: Projecting upwardly from a base 1 are two columns 2 and 3 which have secured against rotation in their upper ends sleeve bearings 4 and 5. Mounted for rotation in these bearings are the shafts 6 and 7, or trunnions, of a closed metallic drum 8. If the drum is used as a boiler for a refrigerant, such is admitted through a feed pipe 9, and removed through a suction pipe 10. These pipes pass through the trunnion 6 but do not rotate as they are held stationary by any suitable means. A packing gland 11 is arranged on the outer end of the trunnion 6 to, with the aid of suitable packing, prevent the leakage of the air or refrigerant between the section pipe and the trunnion. The other trunnion 7 is used to rotate the drum in its bearings. This trunnion 7 may be solid or at least closed off from the interior of the drum. The drive may be had by any suitable means through a gear or sprocket 12 mounted on the solid trunnion 7. The speed of rotation of the drum is low, around two to five revolutions per minute, depending upon the factors involved. On the interior of the drum are baffles 13 which carry the refrigerant up and distribute it over the inside of the drum. The baffles are provided with weep holes 14 adjacent the drum wall so that the refrigerant carried up by the baffles will flow down over the drum wall and evaporate therefrom. This increases the area and rate of evaporation of the refrigerant. The refrigerant may fill the drum to or above its center.

Secured to the hollow trunnion bearing 4 and placed adjacent the drum is an arm 15. A similar arm 16 is secured in a similar manner and position to the drive trunnion bearing 5. At the outer ends of these arms are carried bearings 17 and 18. These bearings carry a roll 19 which is placed close to the drum. Around the drum 8 and the roll 19 is placed an endless metallic belt 20. This belt may be of steel, copper, or other suitable highly heat conductive material. The belt may be made to track by crowning the drum or the roll, or both, by placing a straight sided bead on the edge of the drum along the edge of the belt, or by securing to the underside of the belt adjacent to the drum V-shaped guides 21 and 22. These guides may be made of rubberized fabric and secured to the belt by cement or rivets. The corners of the drum adjacent the guides may be beveled at the same angle as the opposed side faces of the guides. The bearing supports for the roll are constructed to allow for their adjustment to and away from the drum to tension the belt. Placed around the bearing 4 and adjacent the end of the drum is a circular end plate 23. The plate has fastened to it a short sleeve 24 having associated with it a packing gland 25. The short sleeve and gland are constructed to freely rotate on the bearing 4. An end plate 26, short sleeve 27, and packing gland 28 similar to those just described, are arranged on the opposite bearing 5 and adjacent of the other end of the drum. The edges of the end plates 23 and 26 are integrated with the adjacent edge portions of the belt by securing between each plate and the belt a rubber skirt, 29 and 30. These rubber skirts may be secured to the belt by means of cements or vulcanizing. Small holes may be cut in the edge of the belt to increase the hold of the rubber to the belt. The rubber skirts may be secured to the disk by means of clamping straps, 31 and 32, or in the same manner as to the belt. Movement of the belt carries the end plates around with it through its pull on the skirts 29 and 30.

A quantity of liquid 33 such as ethanol, ethylene glycol, propylene glycol, or other suitable liquid having a low freezing point, high thermal conductivity, and hygroscopic qualities is placed in the space between the drum and the belt, and the end closure plates and the rubber skirts. In the operation of the device, unless prevented, moisture tends to collect between the belt and the drum and to freeze there. The ice thus formed gradually builds up until it is sufficient to deform and injure the belt. Also, this ice decreases the rate of heat conduction from the belt to the drum. The sealing of the volume inside the belt from the atmosphere, and the use of means, such as the liquids named above, for preventing the solidification of any moisture that may be therein prevents this trouble. Furthermore, whether used as a refrigerator or heater, the use of such a liquid as set forth above increases the rate of heat conduction between the belt and the drum.

Placed below the drum and extending up above the lowest part thereof is a pan 34. This pan is filled with water 35 or other material or liquid which it is desired to treat, until the drum is partly immersed. A float control may be used to keep the height of the liquid constant.

Placed adjacent to but slightly after, in the direction of belt travel, the place 36 where the belt leaves the drum, is a breaking roll 37. This roll may be made of rubber. By varying the distance of this roll from the belt or its pressure upon the belt or upon the material solidified on the belt, the size of the pieces into which the material is broken may be controlled. The breaking roll may be supported in bearings 38 and 39, each carried in an arm, 40 and 41, pivoted about the trunnion bearings 4 and 5 by being secured to loose collars.

With a proper compressor, radiator, and control means connected to the pipes 9 and 10, and in operation to refrigerate the drum, the performance of the device for forming small flat pieces of ice is as follows: A motor rotates the drum at a slow speed and water fills the tank to contact the drum. As the temperature of the drum is lowered, water from the tank will form a thin film of ice on the belt. The thickness of the film is controlled by the temperature of the drum, the height of the water in the tank, the temperature of the water, and the speed of rotation of the drum. It may also be desirable to regulate the final temperature of the ice. This may be done by controlling the temperature and speed of the drum. If the only factor varied is the water level, then the temperature of the ice will be inversely proportional to its thickness. The rate at which ice may be made will be determined by the capacity of the refrigeration plant and the rate of heat conduction through the belt and drum. When the thin sheet of ice formed on the belt comes to the point 36 where the belt leaves the drum, the ice will be broken from close adhesion to the belt by the change in curvature of the belt. The reason for this is that the forces holding the ice to the belt are less than the forces tending to keep the ice in a curved shape. The weight of the breaking roll 37 will reduce the size of the ice chips. The size may in a large degree be controlled by the weight of the breaking roll or its spacing from the belt. The broken pieces of ice fall off the belt over the tensioning roll 19 into any suitable receptacle or chute. Refrigeration is increased by the baffles 13 which carry a refrigerant 42 up along the walls of the drum and allow the liquid to trickle through the weep holes 14 and down the wall. This increases the evaporation area and places that area directly on the wall of the drum.

The rate of heat transfer is increased by the liquid 33 inside of the belt forming a film between the belt and the drum, which film increases the bond or contact therebetween and, hence, the rate of heat transfer between the drum and belt. Also, this liquid by absorbing the moisture inside of the belt prevents the formation of ice on the drum. If lumps of ice form between the belt and drum, the belt will be deformed and ruined.

Figure 4:
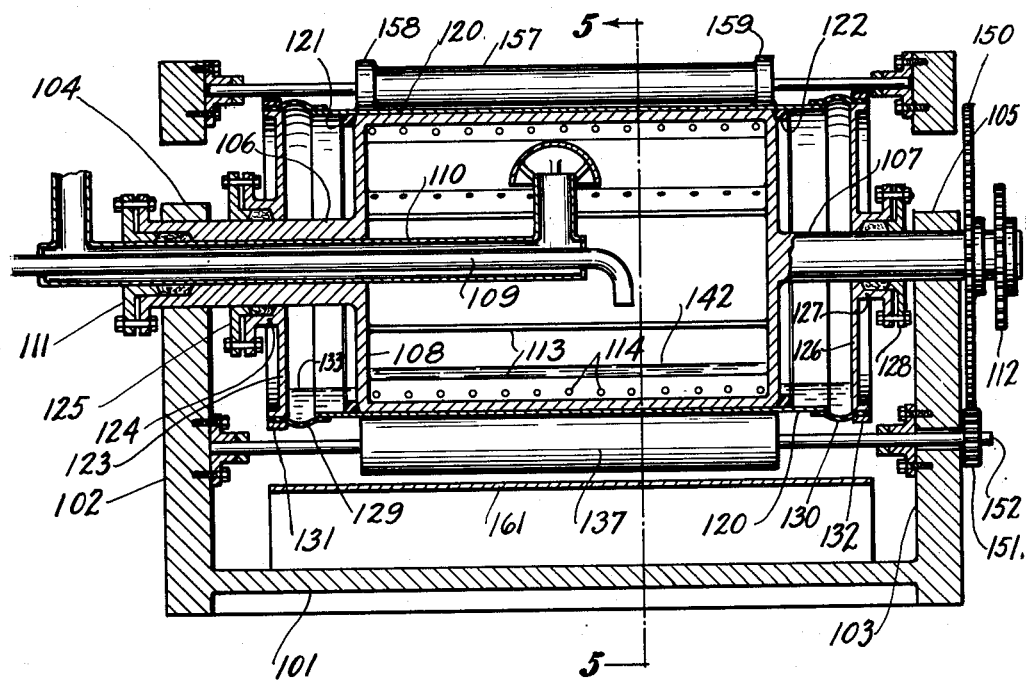
Figure 4 is a longitudinal section taken on the line 4—4 of Figure 5 showing a modified form of my device.
Figure 5:
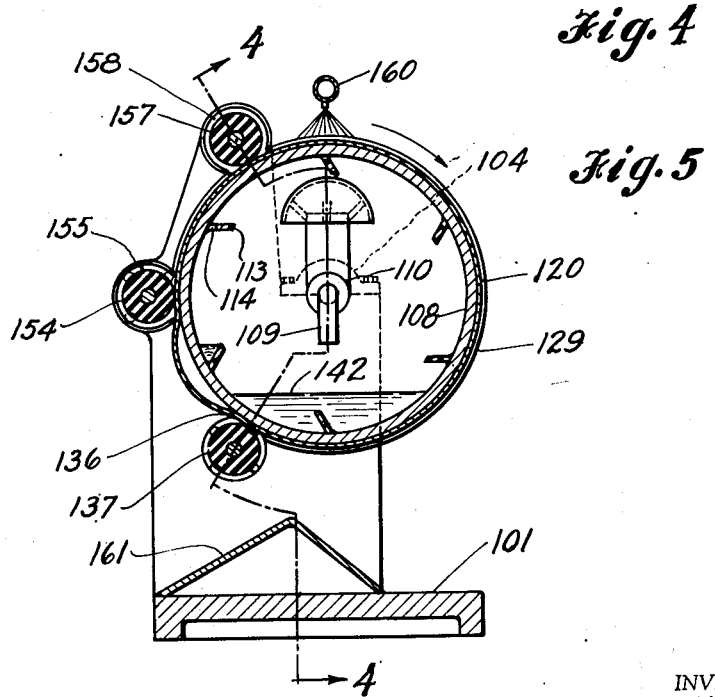
Figure 5 is a full transverse section on the line 5—5 of Figure 4.

*Figures 4 and 5*

Figures 4 and 5 show a modification of the device shown in Figures 1, 2, and 3. Projecting upward from a base 101 are two uprights 102 and 103 which support bearings 104 and 105 in their upper portions. Mounted for rotation in these bearings are the trunnions 106 and 107 of a closed drum 108. The trunnion 106 is hollow and the trunnion 107 is solid. This drum is similar to the previously described drum 8 and may operate in a similar manner as a boiler for the refrigerant or as a heater. The refrigerant is admitted to the drum through an inlet pipe 109 and removed from the drum through the suction pipe 110. The two pipes are concentric, the suction pipe being the outer pipe. Both pipes enter the drum through the hollow trunnion 106. A packing gland 111 is arranged on the outer end of the hollow trunnion 106 to provide a seal for preventing leakage of air or refrigerant between the suction pipe and the trunnion. The solid trunnion is used to rotate the drum in its bearings. This drive may be had through a gear 112 mounted on the solid trunnion and driven by any suitable means. On the interior of the drum are refrigerant distributing baffles 113. These baffles are provided with weep holes 114.

Around the drum is placed an endless metallic belt 120. This belt is greater in length than the circumference of the drum by about five inches. The belt may be made to run true on the drum by any one of the previously mentioned means. In the present embodiment V-shaped guides 121 and 122 are again used. The end openings of the belt are closed by means of disks, or plates. One opening is closed by a plate 123, a sleeve 124 and packing gland 125, as part thereof, and the other opening is closed by another disk 126, short sleeve 127, and packing gland 128. The edges of the disks are integrated with the adjacent edges of the belt in the same manner as in the previously described device by the use of rubber skirts 129 and 130, and cements or vulcanizing, and clamping strips 131 and 132. Also, a quantity of liquid 33, 133 similar to the previously described liquid 33, is placed between the drum and the belt, and in the space inside the belt.

Spaced around the drum and in contact with the belt are three rolls. Two of these rolls cause the belt to bulge and change curvature at a point 136 adjacent one of the rolls. This later roll 137 is driven from the same power source as the drum. This is accomplished by placing on the driving trunnion 107 a gear 150 in mesh with a gear 151 on a shaft 152, which shaft carries the roll 137 which it is desired to drive. The shaft 152 is bearinged in the uprights 102 and 103. These gears are designed so that the peripheral speed of the roll is slightly greater than the speed of the drum. In the modification shown, this driven roll has been placed near but past the low point of the drum. Near this driven roll and after it relative to the travel of the belt is placed another roll 154 in contact with the belt. This roll 154 is termed an anchor roll and is turned by contact with the belt or the material of the belt. The result of the operation of this construction will be that the extra length of the belt over the peripheral length of the drum will appear as a bulge between these two rolls, 137 and 154. This bulge will cause the brittle material adhering to the belt to be broken therefrom at this place 136 where the curvature of the belt changes as it passes around the bulge.

The rolls are rubber covered so that they will yield to irregularities in the belt and drum, and to variations in the thickness of the material on the belt. The ends 155 and 156 of the roll 154 may be constructed larger than the central portions. The result of this construction is that the trough formed by the roll and the belt will have end walls. This trough may be used for applying material to the belt, the material being placed in the trough from where it spreads upon the belt.

Another feeding roll 157 similar to the roll 154 may be placed after the anchor roll 154 to aid in applying more material to the belt. This second feeding roll may have large ends 158 and 159 similar to the large ends of the anchor roll 154. Material may also be applied to the belt by spraying thereon by means of a spray pipe 160, or a tank similar to the one shown in connection with the device shown in Figures 1, 2, and 3 may be used. A chute 161 may be used for conducting the flakes of ice away from the drum.

The operation of this device is similar to the one shown in Figures 1, 2, and 3. A heat transfer liquid 142, or gas, being placed in the drum and the drum being brought to the proper temperature, material placed in the troughs formed by the rolls 154 and 157 will be picked up by the belt as it is carried around by the drum. In the course of this movement of the material it will be solidified by the conduction of heat to or from the material. This sheet of material will pass under the roll 137 and as the curvature of the belt varies from that of the curvature of the drum, the adhesion of the material to the drum will be broken. The weight of the material, the continued change in curvature of the belt, and the pressure of the driven roll will cause the sheet of material as it leaves the belt to be broken into small pieces. These pieces will be conducted from the device by the chute 161. The driving of the roll 137 at a peripheral speed faster than the speed of the belt will cause the belt to be tensioned through the longest distance between the anchor and driven rolls, and will cause the bulge through the short distance between the driven roll 137 and the adjacent anchor roll 154. The feeding action of the anchor roll 154 and the feeding roll 157, prevents material from being spread the full width of the belt. This is desirable as it keeps the ends of the device free from the material and it prevents the material gradually working into and breaking the seal of the rubber skirts 129 and 130 and the belt.

It will be noted that the low point of the drum is reached before the ice or other material is broken from the belt, and that the edges of the belt extend over the edges of the drum. By having the edge of the belt extend a considerable distance over the edge of the drum, the solidification of material on the edge of the belt is prevented as there is but poor heat conduction to or from this area. Any liquid material on this area adjacent the edge of the belt will tend to leave the belt at the low point of the belt and to thereby be separated from the solid material.

This construction shown in Figures 4 and 5 is, as compared to the previous one, simpler in that the tensioning roll inside of the device is dispensed with. Also, the displacement of the belt from the drum may be less, hence, the strain on the seals is less. The present construction is simpler and easier of adjustment.

The use of the liquid 133 inside of the belt, such liquid having: a low freezing point, a high boiling point, and hygroscopic properties, increases the rate of heat transfer and prevents the solidification of moisture between the belt and the drum.

Figures 6 and 7

Figures 6 and 7 illustrate another modification of my invention.

Projecting upward from a base 201 are four columns 202, 203, 204, and 205. These columns are secured to and support end plates 206 and 207. One end plate has secured to it the bearing 208, and the other end plate has secured to it the bearing 209. These bearings support for rotation a drum 210 by holding trunnions 211 and 212 which are secured to the drum. The drum may be used as a boiler for a refrigerant or as any other heat transfer means. The refrigerant is delivered to and removed from the drum through the trunnion 211 which is hollow and contains the concentric pipes 213 and 214 for this purpose. The refrigerant pipes are secured against rotation with the drum. A packing gland 215 prevents leakage between the trunnions and the outside pipe 214. The other trunnion 212 is solid and serves as means for driving the drum. The drive being had by any suitable power source through the sprocket 216 mounted on the driving trunnion 212.

Bearings 217 and 218 secured to the end plates carry the idling, or tensioning, roll 219. The tensioning roll may be mounted so that it is adjustable to and from the drum. Around the drum and roll are placed an endless metallic belt 220. The drum and roll may be crowned to aid the belt in tracking on the drum and to prevent its running off.

In order to seal off the interior of the belt from the atmosphere, seals 221 and 222 are placed between the edges of the belt and the end plates. These seals may be formed of one or more graphite and fibre strips laid in grooves in the edges of the end plates. Other known seals may be used in place of the kind shown and described. It will be noted that a considerable space exists between the end of the drum and the end plate. The purpose of this space is to decrease the conduction of heat from the drum to the end plates, to decrease the conduction of heat to or from the edges of the belt, and to prevent the spread of the maerial being treated over the edges of the belt. To aid in preventing the spreading of material over the edges of the belt, strips of rubber 223 and 224 may be secured to the edges of the belt. These curb strips may be secured in place either by cement or vulcanization.

If the present device is to be used for refrigerating, it is important that the interior of the belt be kept free of moisture, as condensation and formation of ice between the belt and the drum ruins the belt and reduces the rate of heat transfer. For this reason the end plates and the seals 221 and 222 are provided. For this reason there is also provided a container 225 for a hygroscopic material so that any moisture that may reach the interior of the belt will be absorbed by the material in the container and not condense on the belt or drum. Also, there is provided means for maintaining the interior of the belt under a slight pressure above the atmosphere outside of the belt, and of supplying dry air to the interior of the belt. This means comprises a pipe 226 connecting the interior of the belt with a small air pump 227 such as a gear pump. The interior of this pump is connected to an air dehydrator 228 such as a box filled with quick lime. A check valve 229 may be placed in the line to prevent the reverse travel of air. The use of a pump for delivering dry air under pressure to the interior of the belt prevents the ingress of moisture laden air through the sliding seals 221 and 222, or through the bearings or other openings that may be present in the construction.

Material may be supplied to the belt for treatment by means of one or more rubber feed rolls 230 similar to the previously described feed rolls. This roll also has the enlarged ends 231 and 232 which when the roll is pressed against the belt will form ends for the trough formed by the belt and the roll.

The adhesion of the treated material to the belt is broken at a point 236 where the curvature of the belt is varied by the belt leaving the drum to pass around the idler roll 219. As this point is on the underside of the drum the material will break off and fall unless it is very elastic. The size of the pieces into which the material breaks may be controlled by placing just after the point 236, where the curvature changes, a breaking roll 237, and having this roll contact and press upon the material. This roll will flatten out the material and cause further breakage of the material. Also, this roll prevents material from leaving the belt and by stripping back along the belt breaking away in large pieces.

The operation of this modification is much the same as those previously decribed. If used for forming a sheet of ice, the drum is refrigerated by pumping a refrigerant into the drum through the feed pipe 213 and removing the vapor from the drum through the return pipe 214. However, prior to refrigerating the drum the container 225 inside of the belt, for hygroscopic material, should be filled with a suitable material, and the small air pump 227 should be operated to prevent the passage of vapor into this space inside of the belt. A refrigerant 242 must not be passed into the drum until the moisture has been removed from inside of the belt. The pressure formed by the air pump will prevent infiltration through the seals 221 and 223, or other places. The drum is rotated by any suitable prime mover operating the sprocket 216 on the trunnion 212. Water is placed in the trough of the feeding roll 230 and its level maintained by any suitable supply means. If a thick sheet of ice is desired it may be necessary to provide more than one feed roll for feeding the water on in successive steps. As the water is carried around the belt and drum, it will be frozen and cooled to the desired degree. When the ice reaches the point 236 where the curvature of the belt varies as it leaves the drum, the ice will be broken from the drum. However, before the ice can fall from the drum it will be carried under the breaking roll 237 which will prevent large sheets from stripping from the belt and will break the ice into small flakes, or pieces. The distance of the breaking roll from the belt will in a large measure control the size of the flakes which are delivered from the machine. The rubber curbs 223 and 234 secured at the edges of the belt aid in preventing the flow of water over the edge of the belt. The belt overlaps the edges of the drum to prevent in as large a measure as possible the freezing of the ice against the curbs.

With the use of fixed end plates and sliding friction seals, it is possible to increase the distance between the drum and the idling roller. In fact, instead of the use of an idling roll there may be used two heat transfer drums, and they may be spaced some distance apart. The material to be solidified upon the belt may be applied at more than one point and removed at the points where the curvature of the belt changes.

In Figure 8 the drum 308 has a belt 320 around it. Adjacent the end of the drum is an end plate 323 which is moved with the drum around its axis by means of the annular metallic seal 329 made up of a thin sheet of flexible metal. The seal may be integrated with the belt by means of rivets 331 or brazing, or both. Instead of one corrugation, as shown, the seal may have a plurality of concentric corrugations. As shown, the belt overhangs the edge of the drum by a considerable distance. This is important for several reasons. It prevents the solidification on the edge of the belt of the material being treated. It allows some if the stresses set up by the deformation of the belt to break loose the solidified material, to be taken up by a bending of the belt over the edge of the drum. When the belt is held centered on the drum by a crowning of the drum, it allows some shifting of the belt without contact of the drum and seal. In the present modification it, also, allows the U-shaped seal to extend inwardly of the edge of the belt.

In the operation of the present device, the drum, seal, and end plate will rotate together. The curvature of the belt may be changed by any of the means disclosed herein. At the place where the curvature of the belt is changed, the fold or folds of the seal will be extended to allow for the distortion. The overhang of the belt will also allow for some of the distortion. Of course, if only a single fold is used, as shown, it may extend outwardly away from the drum instead of inwardly as shown. When the seal extends inwardly it reduces the length of the machine and allows the belt to guard the seal from mechanical injury.

The use of flexible metallic seals will allow the placing of a refrigerant in direct contact with the belt, that is in the space between the drum and the roll. Also, the drum may be perforated to allow the refrigerant in the drum to directly contact the belt.

The word "seal" has been used to designate both the flexible or sliding friction seal, and the rigid end plates, as the whole end assembly serves to seal the interior volume of the belt from the atmosphere around the belt.

By means of the above-described devices applicant is able to rapidly form ice flakes of various sizes and to do that at a low cost.

Having thus described my invention, I claim:

1. In a heat transfer device: a heat transfer drum, an endless imperforate belt around and in contact with said drum, the length of said belt being greater than the circumference of said drum, end plates centered on said trunnions and placed adjacent the ends of said drum, means for varying the curvature of said belt, means for rotating said drum, and means sealing said plates to said belt along their respective and adjacent edges.

2. In a heat transfer device: an endless imperforate belt, means supporting said belt for travel through an extended path having a constant curvature and having therein the greater part of the length of said belt, means for solidifying material upon one face of said belt while traveling through said path, means sealing one face of said belt from the other to prevent the solidification of material upon the other face of said belt, and roller means contacting said first mentioned face for varying the curvature of said belt to break the adhesion of said material to said belt.

3. In a heat transfer device: a drum provided for rotation, an endless belt longer than the circumference of said drum, around and in contact with said drum; a pair of rolls outside of said belt and parallel to the axis of rotation of said drum for holding said belt in contact with said drum; and means for driving one of said rolls at a peripheral speed greater than that of said drum.

4. In a heat transfer device: a drum, an endless imperforate belt around and in contact with said drum, the length of said belt being greater than the circumference of said drum, means for solidifying material upon said belt, means for rotating said drum and belt, means tensioning said belt around said drum and varying the curvature of said belt to break the adhesion of said material to said belt, and means placed after the change in curvature of said belt to press upon the material upon said belt and break said material.

5. In a heat transfer device: a rotatable heat transfer drum, an endless imperforate metallic belt arranged in contact with said drum, the length of said belt being greater than the circumference of said drum, means for varying the curvature of said belt, and means sealing the end openings of said belt comprising fixed end plates coextensive with the end openings, and sealing means between said belt and said end plates.

6. In a heat transfer device: a heat transfer drum; an endless imperforate belt, said belt being longer than the circumference of said drum, and being placed around and in contact with said drum; means tensioning said belt around said drum; means for rotating said drum and driving said belt; and end means closing the end openings of said belt for forming with said belt a closed chamber.

7. In a heat transfer device: a refrigerated drum; an endless imperforate belt, said belt being longer than the circumference of said drum, and being placed around and in contact with said drum; means tensioning said belt around said drum; means for rotating said drum and driving said belt; end means closing the end openings of said belt for forming therewith a closed chamber; and means for dehydrating any gas that may be in said chamber.

8. In a heat transfer device: a heat transfer drum: an endless imperforate belt, said belt being longer than the circumference of said drum, and being placed around and in contact with said drum; means for tensioning said belt around said drum; means for rotating said drum and driving said belt; end means closing the end openings of said belt for forming therewith a closed chamber; and a liquid in said chamber and in contact with said belt and drum, which liquid will remain liquid at the operating temperature in the device.

9. In a heat transfer device: a refrigerated drum; an endless imperforate belt, said belt being longer than the circumference of said drum, and being placed around and in contact with said drum; means tensioning said belt around said drum; means for rotating said drum and driving said belt; end means closing the end openings of said belt for forming therewith a closed chamber; and an anti-freeze liquid in said chamber and in contact with said belt and drum.

10. In a heat transfer device: a drum; an endless imperforate belt; said belt being longer than the circumference of said drum, and being placed around and in contact with said drum; means for rotating said drum and driving said belt; means for refrigerating said drum; end means closing the end openings of said belt for forming therewith a closed chamber; and means for maintaining the pressure in the space inside of said belt above the surrounding atmospheric pressure and for delivering to said space a substantially dry gas, whereby solidification of moisture upon said drum is prevented.

11. In a heat transfer device: a heat transfer drum; an endless imperforate belt, said belt being longer than the circumference of said drum, and being placed around and in contact with said drum; means tensioning said belt around said drum; means for rotating said drum and driving said belt; and end means closing the end openings of said belt for forming therewith a closed chamber, comprising for each opening a metallic ring having annular corrugations.

12. In a heat transfer device: a heat transfer drum; an endless imperforate belt, said belt being longer than the circumference of said drum, and being placed around and in contact with said drum; means for rotating said drum and driving said belt; and end means closing the end openings of said belt for forming therewith a closed chamber, comprising a conical metallic ring secured to each edge of said belt.

13. In a heat transfer device: a heat transfer drum; a supporting trunnion for said drum; means for supplying to and removing from said drum through said trunnion a heat exchange medium; an endless imperforate belt; said belt being longer than the circumference of said drum; and being placed around and in contact with said drum; and plates opposed to the ends of said drum; means sealing said plates to said belt; said trunnion, sealing means, and said end plates closing the end openings of said belt for forming with said belt a closed chamber; means tensioning said belt around said drum; and means for rotating said drum.

14. In a heat transfer device: a heat transfer drum; supporting trunnions for said drum; means for supplying to and removing from said drum through one of said trunnions a heat exchange medium; an endless imperforate belt, said belt being longer than the circumference of said drum, and being placed around and in contact with said drum; end plates mounted on said trunnions and opposed to the ends of said drum; a stretchable medium secured between and to the edges of said end plates and belt; said trunnion, stretchable medium, and end plates closing the end openings of said belt for forming with said belt a closed chamber; a tensioning roll placed inside of said chamber, and outside of and parallel to said drum; means supporting said roll on said trunnions and in contact with said belt for tensioning said belt; and means for rotating said drum by rotating one of said trunnions.

15. In a heat transfer device: an endless imperforate belt, means supporting said belt for travel through an extended path having a constant curvature and having therein the greater part of the length of said belt, said means supporting said belt furnishing a continuous rigid support therefor along said path, means for solidifying material upon one face of said belt while traveling through said path, means sealing one face of said belt from the other to prevent the solidification of material upon the other face of said belt, and roller means contacting said first mentioned face for varying the curvature of said belt to break the adhesion of said material to said belt.

16. In a heat transfer device: an endless imperforate belt, means supporting said belt for travel through an extended path having a constant curvature and having therein the greater part of the length of said belt, said means supporting said belt furnishing a continuous rigid support both along and transversely of said path, means for solidifying material upon one face of said belt while traveling through said path, means sealing one face of said belt from the other to prevent the solidification of material upon the other face of said belt, and roller means contacting said first mentioned face for varying the curvature of said belt to break the adhesion of said material to said belt.

17. In a refrigeration device: a rotatable heat transfer drum; an endless imperforate belt, said belt being longer than the circumference of said drum, being placed around and in contact with said drum, and being movable with said drum; end means closing the end openings of said belt; and means for refrigerating said drum by evaporation therein of a refrigerant.

18. In a heat transfer device: a rotatable drum; an endless imperforate belt, said belt being longer than the circumference of said drum, being placed around and in contact with said drum, and being movable with said drum; end means closing the end openings of said belt to form therewith a closed chamber; and means for refrigerating said chamber by evaporation therein of a refrigerant.

19. In refrigerating apparatus, in combination, an evaporator having a continuous curved refrigerated surface, an endless flexible belt encompassing said refrigerated surface and contacting a portion thereof, means closing the open sides of said endless belt, deflector means adapted to flex successive sections of said belt out of contact with said evaporator, and a liquid positioned between said belt and said refrigerated surface adapted to keep wet the contacting surfaces thereof.

20. In refrigerating apparatus, in combination, a framework, a refrigerated member mounted on said framework and having a rigid convexly curved refrigerated surface, an endless flexible metal belt encompassing said refrigerated member and having a greater periphery than said member, means for tensioning said belt against said convexly curved refrigerated surface, means for imparting relative movement between said belt and said surface, and sealing means including an apron extending from said belt and including means extending from said framework, said apron and last-named means coacting to seal the space between said belt and said refrigerated surface from the atmosphere.

FRANK W. KNOWLES.

REFERENCES CITED

The following references are of record in the file of this patent:

UNITED STATES PATENTS

| Number | Name | Date |
|---|---|---|
| 2,005,734 | Field | June 25, 1935 |
| 2,054,101 | Short | Sept. 15, 1936 |
| 2,064,655 | Gever | Dec. 15, 1936 |
| 2,112,596 | Field | Mar. 29, 1938 |